(12) United States Patent
Fanelli et al.

(10) Patent No.: US 12,405,662 B2
(45) Date of Patent: Sep. 2, 2025

(54) SCREEN INTERACTION USING EOG COORDINATES

(71) Applicant: Dolby Laboratories Licensing Corporation, San Francisco, CA (US)

(72) Inventors: Andrea Fanelli, Oakland, CA (US); Evan David Gitterman, Palo Alto, CA (US); Nathan Carl Swedlow, Oakland, CA (US); Alex Brandmeyer, Berkeley, CA (US); McGregor Steele Joyner, Alameda, CA (US); Scott Daly, Kalama, WA (US); Poppy Anne Carrie Crum, Oakland, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 18/290,673

(22) PCT Filed: Jul. 21, 2022

(86) PCT No.: PCT/US2022/037908
§ 371 (c)(1),
(2) Date: Jan. 19, 2024

(87) PCT Pub. No.: WO2023/004063
PCT Pub. Date: Jan. 26, 2023

(65) Prior Publication Data
US 2025/0036195 A1    Jan. 30, 2025

Related U.S. Application Data

(60) Provisional application No. 63/224,062, filed on Jul. 21, 2021.

(30) Foreign Application Priority Data

Aug. 11, 2021    (EP) ..................................... 21190807

(51) Int. Cl.
*G06F 3/01*      (2006.01)
*G06F 3/04845*   (2022.01)
(Continued)

(52) U.S. Cl.
CPC .............. *G06F 3/013* (2013.01); *G06F 3/012* (2013.01); *G06F 3/04845* (2013.01);
(Continued)

(58) Field of Classification Search
CPC ........ G06F 3/013; G06F 3/012; G06F 3/0487; G06F 2203/04806; H04S 7/303; H04R 25/407; A61B 5/6814; G06T 17/00
(Continued)

(56) References Cited

U.S. PATENT DOCUMENTS 5,649,061 A      7/1997   Smyth
5,726,916 A  *   3/1998   Smyth ................. A61B 5/6814
                                                 351/210
(Continued)

FOREIGN PATENT DOCUMENTS

CN      101467875 B      10/2012
CN      108960937 B       7/2019
(Continued)

OTHER PUBLICATIONS

Choi, Hyeon Young et al.; "Identification of Attention State for Menu-Selection Using In-Ear EEG Recording"; 2017 5th International Winter Conference on Brain-Computer Interface (BCI), Sabuk, 2017, pp. 112-114 (2 pages).
(Continued)

*Primary Examiner* — Abdul-Samad A Adediran

(57) ABSTRACT

A method comprising acquiring a set of voltage signals from a set of electrodes arranged in proximity to the ears of a user, based on the set of voltage signals, determining an EOG gaze vector in ego-centric coordinates, determining a head
(Continued)

pose of the user in display coordinates, using a sensor device worn by the user, combining the EOG gaze vector and head pose to obtain a gaze vector in display coordinates, and determining a gaze point by calculating an intersection of the gaze vector and an imaging surface having a known position in display coordinates.

15 Claims, 4 Drawing Sheets

(51) Int. Cl.
      *G06F 3/0487*     (2013.01)
      *H04S 7/00*     (2006.01)

(52) U.S. Cl.
      CPC ............ *G06F 3/0487* (2013.01); *H04S 7/303* (2013.01); *G06F 2203/04806* (2013.01)

(58) Field of Classification Search
      USPC .......................................... 351/210; 381/315
      See application file for complete search history.

(56) References Cited

U.S. PATENT DOCUMENTS

| | | | |
|---|---|---|---|
| 8,157,730 | B2 | 4/2012 | Leboeuf |
| 9,004,687 | B2 | 4/2015 | Stack |
| 9,754,471 | B2 | 9/2017 | Berezhnyy |
| 9,953,650 | B1 | 4/2018 | Falevsky |
| 10,105,105 | B2 | 10/2018 | Hong |
| 10,321,842 | B2 | 6/2019 | Garten |
| 10,365,716 | B2 | 7/2019 | Aimone |
| 2004/0227699 | A1 | 11/2004 | Mitchell |
| 2005/0020934 | A1 | 1/2005 | Potter |
| 2009/0097689 | A1 | 4/2009 | Prest |
| 2010/0001926 | A1 | 1/2010 | Amirparviz |
| 2011/0170067 | A1 | 7/2011 | Sato |
| 2011/0178784 | A1 | 7/2011 | Sato |
| 2014/0198936 | A1 | 7/2014 | Higgins |
| 2015/0126845 | A1 | 5/2015 | Jin |
| 2015/0190607 | A1 | 7/2015 | Sugio |
| 2016/0029883 | A1 | 2/2016 | Cox |
| 2016/0119726 | A1 | 4/2016 | Pontoppidan |
| 2017/0115742 | A1 | 4/2017 | Xing |
| 2017/0180882 | A1 | 6/2017 | Lunner |
| 2018/0149864 | A1* | 5/2018 | Gibbs ..................... G06T 17/00 |
| 2018/0300897 | A1 | 10/2018 | Woods |
| 2018/0341328 | A1 | 11/2018 | Agell |
| 2019/0030277 | A1 | 1/2019 | Espi Maques |
| 2019/0053756 | A1 | 2/2019 | Ayers |
| 2019/0122125 | A1 | 4/2019 | Dragicevic |
| 2019/0182415 | A1* | 6/2019 | Sivan ...................... G06F 3/013 |
| 2019/0253812 | A1 | 8/2019 | Gallégo |
| 2020/0218338 | A1 | 7/2020 | Lee |
| 2020/0249752 | A1 | 8/2020 | Parshionikar |
| 2020/0364539 | A1 | 11/2020 | Anisimov |
| 2022/0141604 | A1* | 5/2022 | Udesen ................ H04R 25/407 381/315 |

FOREIGN PATENT DOCUMENTS

| | | |
|---|---|---|
| CN | 112764532 A | 5/2021 |
| JP | 2008067219 A | 3/2008 |
| JP | 2014504413 A | 2/2014 |
| JP | 2016206960 A | 12/2016 |
| JP | 2017539108 A | 12/2017 |
| JP | 2019197369 A | 11/2019 |
| JP | 2020504959 A | 2/2020 |
| WO | 2016154298 A1 | 9/2016 |
| WO | 2017156570 A1 | 9/2017 |
| WO | 2018058253 A1 | 4/2018 |
| WO | 2019144019 A1 | 7/2019 |
| WO | 2021150971 A1 | 7/2021 |

OTHER PUBLICATIONS

G. Browder and W. Chambers, "Eye-enslaved area-of-interest display systems," in Proc. of Flight Simulation Technologies Conference, Atlanta, GA (1988).

Hladek, L'ubos et al.; "Real-time estimation of horizontal gaze angle by saccade integration using in-ear electrooculography"; PLOS One; Jan. 5, 2018; pp. 1-24 (24 pages).

Manabe, Hiroyuki et al.; "Using Earphones to Perform Gaze Detection for Wearable Interfaces"; NTT DOCOMO Technical Journal; vol. 12; No. 3; pp. 12-17 (6 pages).

P. Kortum and W. Geisler, "Implementation of a foveal image coding system for image bandwidth reduction," in Proc. SPIE 2657, pp. 350-360 (1996).

S. Daly, K. Matthews, and J. Ribas-Corbera, "As Plain as the Noise on Your Face: Adaptive Video Compression Using Face Detection and Visual Eccentricity Models", Journal of Electronic Imaging V. 10 (01), pp. 30-46. 2001.

* cited by examiner

SCREEN INTERACTION USING EOG COORDINATES

CROSS-REFERENCE TO RELATED APPLICATIONS

This application is a U.S. National Stage application under U.S.C. 371 of International Application No. PCT/US2022/037908, filed on 21 Jul. 2022, which claims priority of the following priority application: U.S. provisional application 63/224,062, filed 21 Jul. 2021 and European Patent Application No. 21190807.4, filed 11 Aug. 2021, each of which is incorporated by reference in its entirety.

FIELD OF THE INVENTION

The present invention relates to eye tracking using electro-oculography (EOG). In particular, the invention relates to use of such eye tracking to determine a gaze point on a display screen.

BACKGROUND OF THE INVENTION

In many situations, eye tracking may be used to understand where a user's attention is focused. In particular, eye tracking may enable improved user control of peripherals.

The most common approach for eye tracking is to acquire video images of the user's eyes. The gaze direction of the user may be determined using appropriate image processing and algorithms based on numerical analysis or deep learning. The downside of such video-based eye tracking is the necessity to have a camera pointed at the user's face, or mounted on the head, which significantly limits the possible applications.

Recently, an alternative to video-based eye tracking has been introduced, involving electro-oculography (EOG). Electro-oculography (EOG) is the measurement of the electrical dipole potential of the corneo-retinal dipole of the eyeball (difference in electrical charge between the cornea and the retina). When the eyes move in the orbit, the dipole rotates. This electrical potential can be measured using a set of electrodes placed near the orbit and can be used to estimate the eye position. The accuracy of the EOG with current technology is estimated to be about 0.5 degrees, with expectations for future improvement.

Compared to video-based eye tracking, EOG-based eye tracking has several advantages:
  Reduced hardware costs, as no camera optics or video processing may be required
  More flexible design, as there is no need to provide cameras with line of sight to eyes
  Greater robustness/accuracy in difficult lighting conditions
  Reduced processing and memory requirements, leading to reduced power consumption, which is particularly important for portable/wearable devices
  No need for camera pointing at user and related privacy issues With recent improvements in electrooculographic determination of viewing angle (referred herein as EOG-based eye tracking), a large number of applications of such eye tracking have been made feasible.

However, a challenge with EOG-based eye tracking, compared to more conventional, camera-based eye tracking, is that the EOG detection takes place relative to the user's head (referred to as an ego-centric coordinate system).

For many applications, for example augmented reality (AR) and virtual reality (VR) applications, the ego-centricity is not a problem. On the contrary, ego-centric eye tracking is highly appropriate for such applications. However, the ego-centricity has to date prevented successful applications of EOG-based eye tracking in many imaging applications.

General Disclosure of the Invention

It is an object of the present invention to overcome or mitigate the above mentioned challenges, and to enable EOG-based eye tracking in various imaging applications.

According to a first aspect of the invention, this and other objects are achieved by a method comprising acquiring a set of voltage signals from a set of electrodes arranged in proximity to the ears of a user, based on the set of voltage signals, determining an EOG gaze vector in ego-centric coordinates, determining a head pose of the user in display coordinates, using a sensor device worn by the user, combining the EOG gaze vector and head pose to obtain a gaze vector in display coordinates, and determining a gaze point by calculating an intersection of the gaze vector and an imaging surface having a known position in display coordinates.

As will be understood by a person skilled in the art, ego-centric coordinates describe a position in relation to the position (pose) of the user, e.g. in relation to the user's head. Similarly, display coordinates describe a position in relation to (some part of) the display device. The location of the imaging surface of the display device is known in display coordinates.

The method preferably includes calibrating the sensor device to obtain a position of the sensor device in display coordinates. Such calibration may be performed prior to determining the head pose, as well as during operation, to recalibrate the system. The calibration of the head-worn sensor serves to make its position known in display coordinates. In a general case, the calibration may be in six degrees of freedom, while in a more constrained application fewer degrees of freedom may be sufficient. In some embodiments, display coordinates have only two degrees of freedom (e.g., x and y). In some embodiments, calibration does not include using or measuring rotational elements of the degrees of freedom of head movements. For example, in applications for which the viewing distance is far relative to the display width, such that it is unlikely the viewer would be making head rotations to see different parts of the display image surface (that is, gazing at different display regions would be solely through the eye rotations). In these situations, the display has a relatively small field of view (FOV), and an example of this viewing would be a smartphone viewed at arms' length.

It is noted that the calibration may take place with respect to the imaging surface itself (e.g. involving interaction with the display as outlined below), or with respect to some other part of the display device, e.g. a projector device.

The head-worn sensor is configured to monitor relative motion of the head. After the initial calibration, the head-worn sensor is thus capable of providing the head pose in display coordinates. The head-worn sensor may include one or several of an accelerometer, a gyroscope and a magnetometer. One type of sensor, useful in this context, is an inertia measuring unit (IMU).

By combining the EOG gaze vector and the head pose, a gaze vector in display coordinates can be obtained. After this, the gaze point may be determined as the intersection of the gaze vector and the imaging surface (which, as mentioned above, is also expressed in display screen coordinates). A step of conversion from physical units on the display (e.g., mm) to pixel position is required, for example.

In some embodiments, the calibration of the head-worn sensor is achieved by synchronizing the head-worn sensor with a second sensor device fixedly arranged relative to the display system (and thus the imaging surface). This embodiment is particularly useful for non-stationary display screens, e.g. smart phones, etc., which typically are provided with an orientation sensor device, such as an IMU.

In some embodiments, a spatial calibration is obtained by determining a distance between the user and the imaging surface. This approach may be more useful for stationary displays, such as TV sets, which typically are not provided with an IMU. In some embodiments, the distance is determined using suitable sensors mounted proximate to or within the display system (e.g., a remote control with an IR transceiver; a LIDAR sensor on the display, such as is becoming common on smartphones).

In some embodiments, the calibration includes displaying a graphical element on the imaging surface, and receiving user input confirming the user is looking at the graphical element. Such calibration has the benefit not only of determining the position of the head-worn sensor in display coordinates, but also of providing a calibration of the entire process, including the EOG gaze vector calculation.

In some embodiments, the method further includes off-line calibration, in order to handle any drift which may take place in the EOG gaze vector detecting process. In some embodiments, such off-line calibration includes statistical analysis of the user gaze point over time, e.g. taking into account the size of the imaging surface, expected regions of interest over time, etc.

The method of the first aspect enables modification of audio data and/or visual data in an audiovisual data rendering system. The modification provides an improved user experience when viewing and listening to an audiovisual presentation of a system such as a TV, a projector display system or a mobile hand held device. Examples of such improved user experience are summarized below.

An EOG-based determination of a gaze point on an imaging surface may for example be used in depth-based rendering of an image, by determining a gaze depth as a depth in the image associated with the gaze point, and, for each pixel in the image, calculating a relative depth as the difference between the depth of the pixel and the gaze depth, and blurring the pixel according to a function of the relative depth. After blurring, the image is depth-rendered on the imaging surface. Such blurring may be done to simulate a natural depth of field as occurs in a 3D scene due to the eye's optics.

As another example, when a depth-based image rendering is combined with a 3D audio field, the gaze point and gaze depth may be used to identify at least one audio object associated with a current point of interest, to allow enhancing such identified audio objects. The current point of interest may be determined as a function of the gaze point.

In yet another example, a gaze point on the imaging surface may be monitored over time using a method as summarized above. Based on the results of this monitoring, an average gaze position and a gaze radius is determined, whereupon the gaze radius is compared with a radius threshold and, if the gaze radius is smaller than the radius threshold, the image data on the imaging surface is zoomed. Such a procedure improves the user viewing experience, for example in a context where high spatial resolution (e.g. 4K or 8K) data is rendered on a small imaging surface such as on a mobile device. In order to provide such an improved user viewing experience also in a case where the average gaze position is not in the center of the imaging surface, it may be advantageous to also determine a smallest distance between the average gaze position and one or more edges of the imaging surface. The smallest distance is then compared with a distance threshold, and in accordance with a determination that the smallest distance is less than the distance threshold, applying an offset off the image data to increase the smallest distance. In other words, such a procedure translates image data, which ensures that zooming in on an object at an average gaze position at the edge of the imaging surface does not put the object out of view.

According to a second aspect of the invention, this and other objects are achieved by a system comprising a set of electrodes arranged in proximity to ears of a user and configured to acquire a set of voltage signals, an EOG processing unit for determining an EOG gaze vector in ego-centric coordinates based on the set of voltage signals, a user-worn sensor device for determining a head pose of the user in display coordinates, and a processing unit configured to combine the EOG gaze vector and head pose to obtain a gaze vector in display coordinates, and determine a gaze point by calculating an intersection of the gaze vector and an imaging surface having a known position in display coordinates.

According to a third aspect of the invention, this and other objects are achieved by a non-transitory computer readable medium storing computer program code configured to perform, when executed on a computer processor, the steps of the method according to the first aspect of the invention.

BRIEF DESCRIPTION OF THE DRAWINGS

The present invention will be described in more detail with reference to the appended drawings, showing currently preferred embodiments of the invention.

DETAILED DESCRIPTION OF EMBODIMENTS OF THE INVENTION

Figure 1:
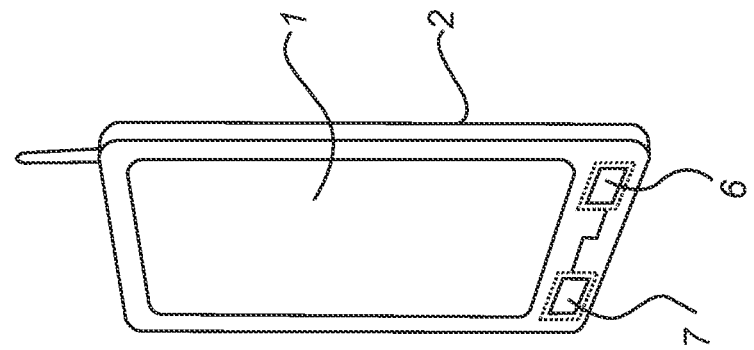
FIG. 1 shows schematically a system for EOG-based gaze point determination according to an embodiment of the present invention.
Figure 1:
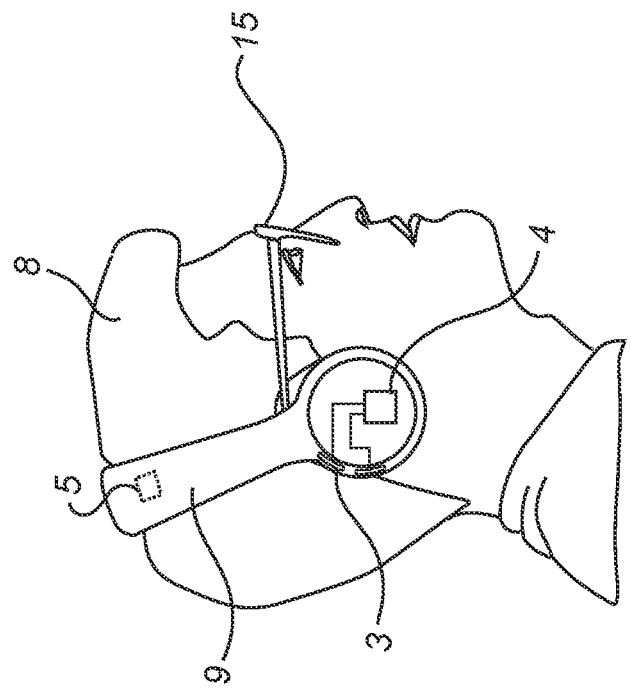

FIG. 1 illustrates the basic elements of a system for EOG-based gaze point detection according to embodiments of the invention. The system is implemented in relation to a display device with an imaging surface 1. In the illustrated case, the display device is a portable device 2, such as a smart phone, but the system may be implemented in any display device with a dedicated imaging surface. For example, the display device may be a stationary display screen, such as a TV set. The display device may also be a projection display system, including an image forming unit (the projector) and an imaging surface (the projection screen) at a distance from the image forming unit. In some embodiments, an imaging surface of a display device is integrated into eyewear components (e.g., a contact lens or eyeglass lens 15).

The system includes a set of EOG electrodes 3 to be arranged on or adjacent to the skin of the user 8, preferably in proximity to the ears, and an EOG processing unit 4 connected to the electrodes 3 and configured to determine a gaze vector in ego-centric coordinates, i.e. relative to the user's head. The gaze vector may have two degrees of freedom (2DOF), which are the horizontal and vertical viewing angles referred to as azimuth (left and right eye direction changes) and elevation (vertical). In a simple application, only one degree of freedom is required (e.g. horizontal viewing angle). In some embodiments, EOG processing unit 4 is further configured to determine a gaze vector based in part on rotation, a torsional eye movement known as Vergence that may occur at close viewing distances (e.g., such as used in knitting).

The system further includes a head-worn sensor unit 5 capable of determining a relative position of the head (head pose), for example an inertia measurement unit (IMU). The sensor unit 5 determines relative motion of an object it is affixed to in six degrees of freedom (6DOF), which include three angular measures of pitch, yaw, and roll and three translational measures in x, y, and z distances. The yaw angle corresponds to azimuth (terminology used for spatial position of sounds relative to the listener) and the pitch corresponds to elevation (not to be confused with an audio frequency). The EOG processing unit 4 and the IMU 5 may be integrated in the same physical unit, e.g. arranged in a headset 9, earbuds, headphones, eyeglasses or similar.

The electrodes 3 are generally transducers configured to convert ionic current flow in the human body into electric current, and examples include biopotential sensors, biopotential electrodes, and other sensing devices. The electrodes 3 may also be integrated in the same physical unit as the EOG processing unit 4 and IMU 5. In particular the electrodes may be integrated in on-ear or in-ear headphones. In addition, techniques known as 'electronic skin', which is a soft, pliable material that is affixed to the skin like an adhesive bandage, may be used to provide the electrodes.

In the illustrated example, the system further includes a second sensor unit, e.g. a second IMU 6, arranged in the portable display device 2, and connected to a central processing unit 7. The CPU 7 is also connected to the display circuitry (not shown) of the display device 2.

The EOG processing unit 4 and the IMU 5 are both connected to the CPU 7, preferably by wireless connection, such as Bluetooth or the like.

Figure 2:
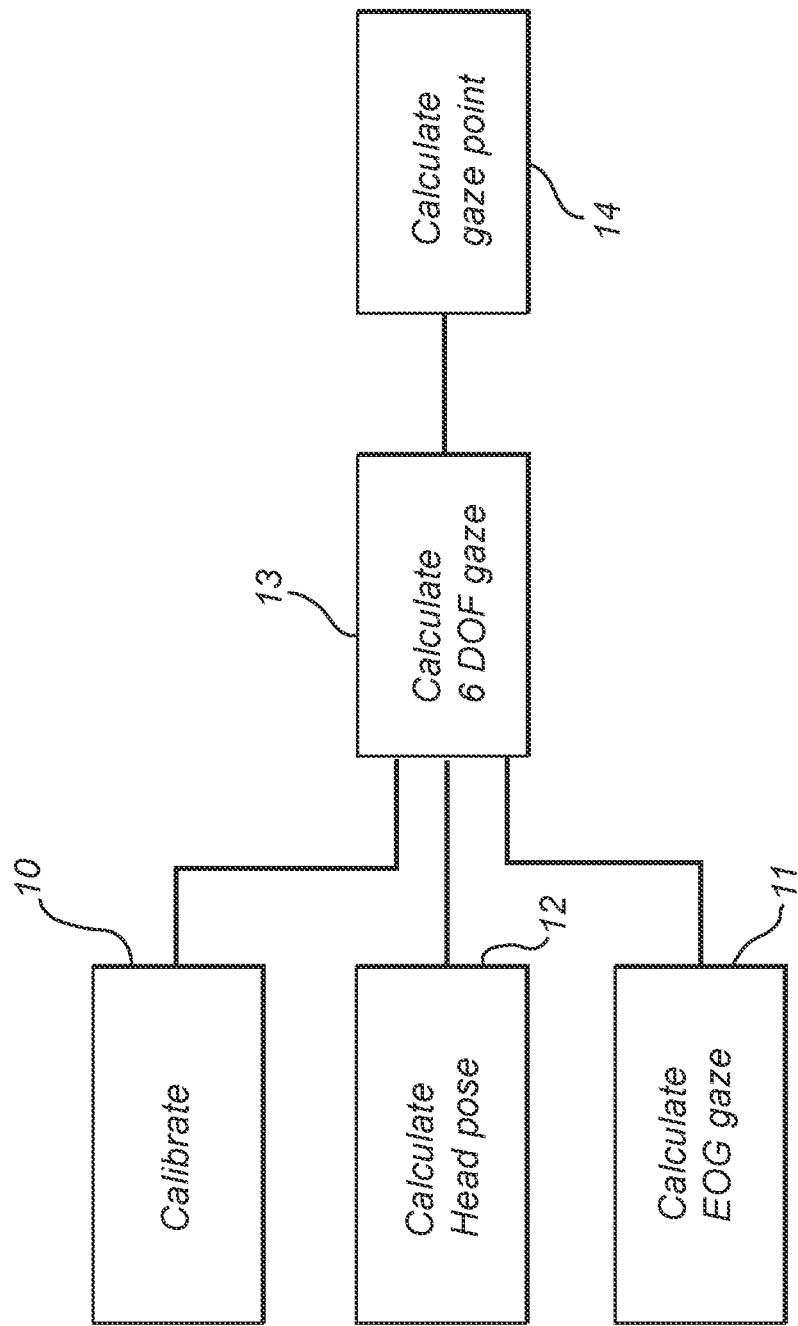
FIG. 2 shows a flow chart of a method for EOG-based gaze point determination according to an embodiment of the invention.

FIG. 2 illustrates the various calculations performed by the CPU 7 to convert the EOG gaze vector to a point on the imaging surface 1. The calculations can be broken down into three coordinate systems, labelled ego-centric, relative world, and display coordinates. Here, relative means absolute physical distances, but unknown absolute position.

First, in block 10, a geometric relationship describing the relative position of the relative world coordinate system with respect to the display coordinate system is determined. In an ideal case, this relationship is a full X, Y, Z position description which covers the case of off-angle viewing to the imaging surface. Alternatively, this relationship is a reduced position description, e.g. consisting simply of a distance, ignoring off-angle viewing aspects. Various ways to provide this calibration will be discussed below.

In block 11 the EOG processing unit 4 provides a gaze vector in ego-centric 2DOF coordinates, and in block 12 the senor unit 5 provides a head pose in relative world coordinates.

In block 13, the EOG gaze vector is combined with the head pose and the geometrical relationship between the relative world coordinates and display coordinates, to obtain a 6DOF gaze vector in display coordinates. Typically, quaternion calculations are used, and these can be first combined in the egocentric system, and then converted to relative and display coordinates, or vice versa.

Now that both the position of the imaging surface 1 and the gaze vector are derived in a common coordinate system (display coordinates), the intersection of the gaze vector and the imaging surface is calculated in block 14. This calculation can be made using standard 3D geometry. The intersection is the gaze point, which can be converted to an X-Y position, represented in physical units, and/or converted to units of pixel positions. The viewer gaze point, typically expressed in pixel positions, may then be used as a key input item in various display-related applications, including those described below.

The calibration in block 10 can be determined in various ways. In some embodiments, the display system (e.g., portable device 2), includes a second relative position sensor unit 6, e.g. a second IMU. Since sensors 5 and 6 only describe differential changes, the calibration involves a synchronization operation between the two sensors. This could be accomplished by the viewer being instructed to hold the head-worn IMU 5 close to the display IMU 6 and then return to the viewing position.

For some display systems, such as TVs, the display IMU 8 would be on the TV at some distance from the viewer, but for mobile displays it would generally be at a handheld distance.

For some display systems, such as a projector system, the display IMU 8 may be on the projector, and not close to the imaging surface 1. However, as long as the position of the imaging surface 1 remains known in display coordinates, it does not matter where the display IMU 8 is located.

Currently, most TVs do not have an IMU, and in such cases a more limited calibration may be employed, simply detecting a distance from the user to the center of the imaging surface, and ignoring the angular aspect.

In one embodiment, a remote control may be used to determine the distance. A coded pattern exchange is sent from the remote to the TV to determine the distance travelled by assessing the time of travel, via use of internal TV system clock cycles. In this case, the distance between the (handheld) remote and the head is also disregarded. Typically, this distance has a rather small component with respect to the imaging surface.

In the case of a handheld phone connected to the system, there are several options to find the distance from the viewer to the imaging surface. For example, a picture of the TV may be acquired from the viewing position. Knowing the phone camera focal length and pixel dimensions, and the screen size (via the model #) of the TV, the distance of the TV from the phone can be calculated from the TV's size in the captured image.

Other techniques to determine a distance to an imaging surface involve providing IR emitters on the TV and corresponding sensors on the head-worn sensor 5, as well as wireless position technology involving active electromagnetic coils.

A more elaborate calibration involves user interaction with the display system via some type of input device. The input device may be a user-worn device such as a headset, some other input device connected to or in communication with the user-worn device, or an input device of the display system. The input device may involve a touch interface, a physical button, a voice interface, or input based on sensing blinking (in a particular manner) on any of the above devices.

In one example, the user has a pointing remote (a remote that can control a visible cursor on the screen; sometimes called a magic wand). Before engaging the EOG gaze point detection, the user is prompted to wear the device containing the head-worn sensor and EOG transducer (e.g., headphones, earbud, eyeglasses implementations). When the head-worn device and display system are turned on, the user is prompted to point the cursor at where they are gazing on the screen. This can be done in an indirect manner such as having a text icon on the cursor position query something like 'if you can read me, click'. This works because the gaze point (foveal position) always corresponds to the position of words being read since it is very difficult to read text even a few degrees outside of the fovea. So, the action of the click combined with the position of the cursor text indicates the gaze point, and the remaining calculations can be calibrated from that basic information. Multiple points on the screen can be tested (such as the four-corners and the center) to get the best calibration, but some applications may opt for as few as one reading position.

It is noted that the described interactive calibration is equally useful for projector display systems.

Such an interactive calibration, sometimes referred to as an "off-line" calibration, will not only determine the position of the head-worn sensor 5 in display coordinates, but will also calibrate the EOG detection process.

A challenge with EOG-based gaze detection is that it is susceptible to drift (e.g., detection error changing over time). Some methods for handling this challenge are disclosed in the co-pending application EP 20153054.0, hereby incorporated by reference. In addition to these methods for avoiding problems with drift, some sort of "on-line" calibration, i.e. calibration during use of the system, would be desirable. Another reason for on-line calibration is drift associated with the detection of translational movements. Typically, the user-worn sensor 5 will be based on some kind of acceleration sensor. The double integration of acceleration to obtain position will be subject to noise and drift, which may require on-line calibration.

Such on-line calibration can be based on statistical analysis of the gaze point over time and knowledge of expected user viewing patterns. For example, for content which has subtitles, viewing patterns corresponding to reading of subtitles may be used for statistical calibration. For example, the modal value of a gaze point histogram would be expected to align with the center of a text block, so if a consistent offset is measured from this position, it can be assumed to be due to drift and corrected. The same is true for any discrete region of interest (ROI) that can be defined. The imaging area may also be used as such. By knowing the size and shape of the imaging area, a calibration can be performed by simply assuming that the user maintains his gaze within the imaging area.

Depth-Based Rendering with Simulated Accommodation Blur

Figure 3:
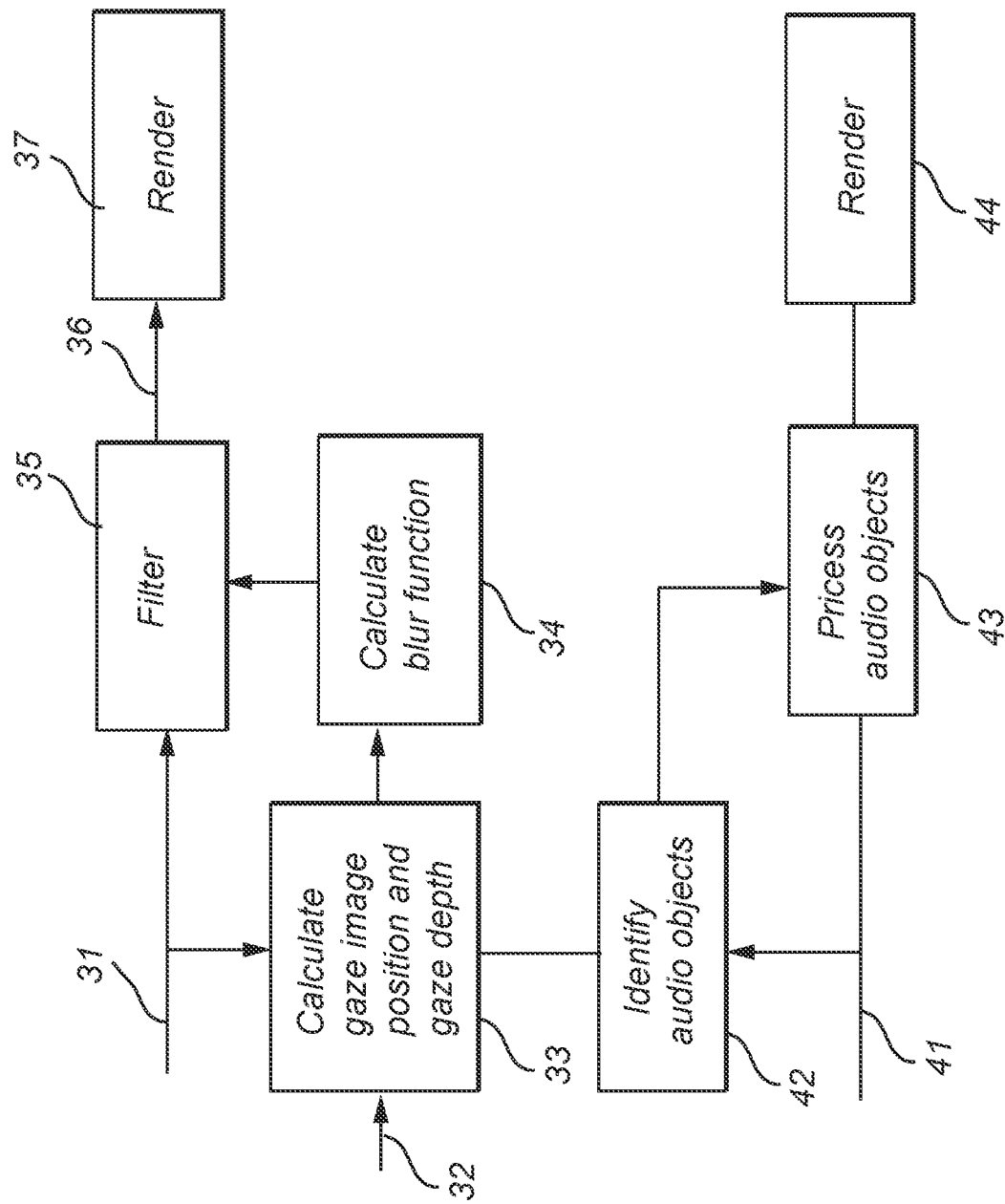
FIG. 3 shows a process for processing depth-based image data and associated audio data according to an embodiment of the invention.

For displays which can show depth information (examples include stereoscopic 3D (S3D), and autostereoscopic 3D (AS3D)) it is important to simulate the depth of field (based on focal length) of the eye. In traditional 3D imaging, the entire image is in focus, regardless of depth (ignoring camera-based depth of field effects), regardless of where the viewer is fixating. However, in natural vision, the accommodation distance of the eye matches the fixation point. The consequence is that depths corresponding to the fixation point are perceived as sharp, while nearer and further depths are out of focus, in which the degree of defocus is dependent on the distance (in units of diopters) from the accommodations distance. Consequently, for more natural and realistic (and possibly more comfortable) 3D displays, it is important to simulate the effects of accommodation blur, which is the blur which increases as the distance from the accommodation distance increases. To accomplish this, the fixation point of the eye in the image needs to be known, which is normally not the case. However, with the EOG technology discussed herein, the gaze point maybe determined, and this gaze point may then be applied to depth-based rendering e.g. in S3D and AS3D displays. An example of a process for depth-based image rendering is shown in FIG. 3. The process receives as input image data 31 including depth information, also referred to as a 3D image representation, and a gaze point 32 in display coordinates.

The image data may be a set of voxels, I (x, y, z) or may be a pair of 2D images (L and R views) often combined with a depth map of the image, or may be a 2D image combined with a depth map. In depth imaging, x is typically the horizontal direction (L-R), y is the vertical direction, and z is the distance from the viewer to the imaged object. The gaze point may be determined using a process discussed above with reference to FIGS. 1 and 2.

In block 33 the gaze point (in display coordinates) is used to calculate the corresponding gaze image position $x_G$, $y_G$ and a gaze depth, $z_G$, i.e. the image depth in this image position. This may be achieved via the input depth plane, via voxel index z, or via calculation from the L-R stereo pair).

Then, in block 34, a local spatial blur function is calculated for the image. The function may be a point spread function (PSF) that varies as a function of the relative depth, $\Delta z$, of a specific pixel position. The relative depth $\Delta z$ is defined as the difference in depth between the gaze depth $z_G$ and the depth z in a particular pixel. In one example, PSF has the same shape in all pixel positions, but the width is scaled up and down to create more or less blur, respectively. Instead of a PSF, more advanced approaches may be applied to determine the amount of blur. In one embodiment, a human visual system (HVS) model of the optics of the eye is used.

Next, in block 35, the position-varying blur function is applied to every 2D pixel position, thereby filtering the input images as a function of the relative depth. If the input is a L-R pair, both images are filtered. For an input of a single 2D plus a depth map, the single 2D image is filtered.

Regardless of the specifics of the technique based on the input format, the result is a depth rendered image 36 with a simulated accommodation blur based on the viewer's gaze point. This image is then rendered in block 37 to the specifics of the 3D display, e.g., for a S3D display consisting of a L-R image pair, or an AS3D display using multiple views.

Depth-Based Image and Audio Rendering

In some applications, depth-based imagery is combined with a 3D audio sound field (e.g., Dolby Atmos). In such applications, the gaze point may be used to identify one or several objects in the line of sight of the viewer, and the gaze depth (e.g., the depth of the gaze point) is used to assess a fixated depth position. An example of a process for such depth-based audio rendering is also shown in FIG. 3, here in combination with the depth-based image discussed above.

Audio data 41 with spatial audio objects, each comprising an audio signal and metadata for spatial rendering, is received together with the gaze image position $x_G$, $y_G$ and the gaze depth $z_G$ determined in block 33. In block 42, at least one audio object associated with a current point of interest is identified based on the gaze image position and gaze depth.

In block 43, the audio data 41 is processed so as to isolate, or accentuate, the identified audio objects (representing audio objects that are being gazed at). For example, the audio objects near the current point of interest may be increased, so as to solve a "cocktail party effect" of dialogue confusion. Other sorts of adjustments may also be applied depending on the intent of the content creator or the preferences of the viewer and listener, including loudness and frequency distribution modifications. Finally, in step 44, the processed audio data is rendered.

It is noted that although the herein described audio object processing is illustrated in combination with simulated accommodation blurring, the gaze point based audio object processing may also be implemented on its own.

Gaze Point Dependent Zoom and Pan

Formats of higher spatial resolution (4K, and especially 8K) pose problems when content is being viewed across a range of devices. With 8K for example, the optimum viewing distance is 0.8 picture heights, which corresponds to a FOV of greater than 80 degrees. This generally requires a very large display. If the same content is viewed on a mobile phone, the FOV can be as low as 15 degrees. This means that all the objects in an image will be proportionally smaller on the retina, and thus it will be more difficult to see all the features of the object. A simple example is that a facial expression on a face rendered for an 8K display may be unrecognizable when viewed on a mobile phone.

A solution to this problem is to zoom into the object of interest (or region of interest, ROI). Such a zoom requires a zoom factor and a translation (image offset). Since most zoom functions operate from the center of the image, an offset is not required in the special case when the ROI is already in the center of the image. But if the object is not in the center of the image, a center-based zoom can place the objects of interest off to the edges of the image, or even off the screen entirely. Regardless of the object position, making such adjustments are difficult when they need to be performed in real-time, such as for video. Historical versions of the problem include 'pan & scan' which was used for conversion of wider screen cinema format (16:9 aspect ratio) content to formerly narrow screen TV formats (4:3). The pan referred to a horizontal offset prior to scanning the film into the video format. This solution was generally performed by a human operator and did not usually include the zoom option. More advanced techniques that worked automatically by analyzing the image content have not found widespread usage without human supervision. Newer automated algorithms that include zoom and offsets that analyze image content or metadata exist, but these are not able to take advantage of the viewer's interest. For example, ROI metadata may exist, but it is defined by the content producer. Often, the viewer's interest may deviate from the producer's predicted ROI. Also, existing techniques usually do not consider the wide range of FOV variation (and thus image object size changes) across the wide range of displays in today's ecosystem (from cinema at >80 deg to smartwatches at <5 deg).

Figure 4:
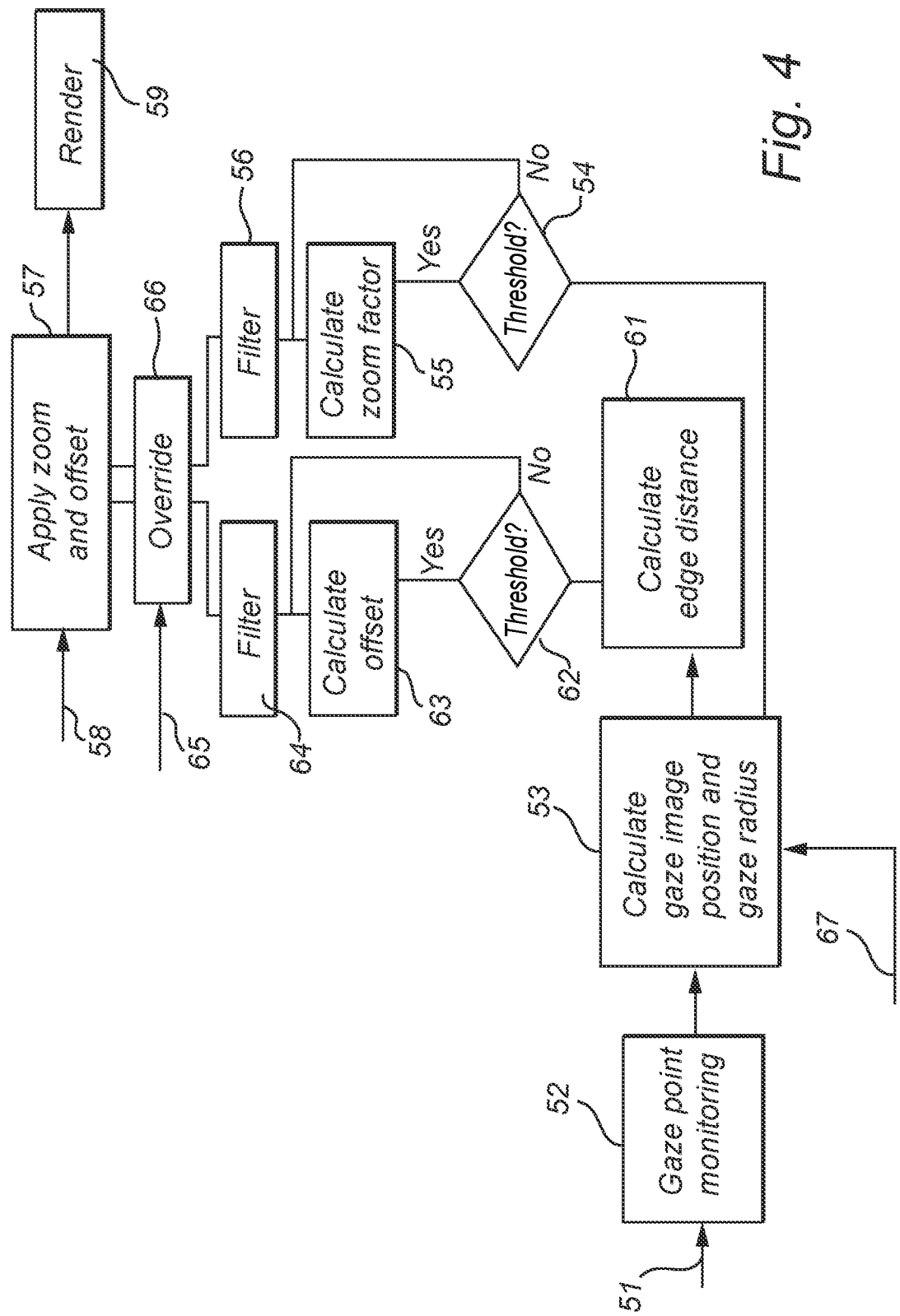
FIG. 4 shows a process for zoom and pan of image data according to an embodiment of the invention.

The EOG-based gaze point determination discussed herein may be used to provide an improved, viewer-determined zoom and pan. An example of such a process is shown in FIG. 4.

In this process, a current gaze point 51, determined as described above, is received by a gaze point monitoring block 52. In block 53, an average gaze position $\mu_x$, $\mu_y$ is determined using a moving (sliding) time window of a predetermined duration $t_{win}$. Further, a variance measure of the average gaze position, e.g. a standard deviation $\sigma$, is determined. This variance measure, here referred to as a "gaze radius" of the average gaze position, is indicative of the viewer's degree of focus.

A small gaze radius indicates that the viewer is focused on a small part of the rendered image (for example due to 8K wide screen content being displayed on a mobile phone). Since human visual-spatial bandwidth and sensitivity falls off rapidly away from a fixation point, the parts of the image presented on the rest of the display is generally wasted, and it may be appropriate to zoom into the image where the viewer has been fixating. On the other hand, if the gaze radius is relatively large, it means the viewer is scanning many portions of the image, which all may be equally important to the viewer. In such a case, it may not be appropriate to zoom into the image.

In block 54, the gaze radius is compared to a first threshold, rth, which represents an implicit model of visual attention, being larger than the fovea (~5 deg) but less than the perifovea (~18 deg). If the determined gaze radius is less than the threshold, a zoom factor is determined in block 55. The zoom factor may be temporally low-pass filtered in block 56 to achieve generally smooth and non-noticeable changes (except possibly in special-case applications with a direct eye-based user interface). Then in block 57, the zoom factor is applied to the image data 58, before the image data 58 is rendered in block 59. The image data 58 may be 2D video imagery, but the process in FIG. 4 may also be applied to 3D image data.

The rendering is accomplished using usual means, such as including other format conversions, color and tone display mapping, etc.

If it is determined in block 54 that the gaze radius is larger than the threshold rth, the zoom factor may be maintained at its current value, as viewing is a continuous process.

The process in FIG. 4 also includes adjustment of a spatial offset. In block 61, a distance $d_{edge, min}$ is determined, equal to the smallest of the average gaze position and any one of the edges of the image. This distance is compared to a second threshold, $d_{threshold}$, in block 62. If the distance to the edges is smaller than the threshold, the viewer's point of interest is considered to be too close to the edge of the image, and an offset (in x and y) is calculated in block 63 to bring the point of interest closer to the center of the displayed image. The offset may be temporally low-pass filtered in block 64 to ensure smooth, non-distracting, and subtle changes to the content. The offset is then applied in block 57, together with the zoom factor, before the image data 58 is rendered in block 59.

If it is determined in block 62 that the distance to the edges is greater than the threshold, the offset is maintained as it was in previous frames.

The offset serves at least two purposes. One is to ensure that the zoom effected by the applied zoom factor does not push the region of interest (the area around the average gaze position) outside the image surface. A second is to limit visibility of the borders of the image, to enable better immersion in the content.

Two types of image metadata are shown in FIG. 4.

Firstly, ROI metadata 65, determined by the content producer/provider, may indicate an image region that doesn't match the viewer's interests. In the case where producer intention (conveyed through the ROI metadata) is deemed more important than the viewer's instantaneous interest, an override option 66 can replace the offset and zoom factor, or blend the offset and zoom factor provided by the metadata 65 with those determined from the EOG process described above.

Secondly, scene cut metadata 67 may be used to reset the computations of the average gaze position in block 53. This is because at scene cuts, larger eye movements occur as the viewer orients to the scene, and perhaps to a new, small, local region of the image. The expression 'scene cut' primarily refers to an actual change in the scene, as opposed to a 'camera cut' which often involves different viewpoints the same scene, such as for back-and-forth character exchanges.

The process in FIG. 4 does not show zooming out. Zooming out may be implemented by comparing the gaze radius to a further radius threshold. If the gaze radius is larger than this threshold, the image would be zoomed out by decreasing the zoom factor (assuming the zoom factor was greater than one). It is noted that zooming out (decreasing the zoom factor) does not require any spatial offset, as all content will be pushed towards the center during zooming out. All other steps would be analogous to those described above.

A special case of zooming out is a reset by scene cut metadata 67. At a scene cut, it may be appropriate to return the zoom factor to full image view (zoom factor=1), thereby effecting an instantaneous zoom out.

Generalizations

As used herein, unless otherwise specified, the use of the ordinal adjectives "first", "second", "third", etc., to describe a common object, merely indicates that different instances of like objects are being referred to, and is not intended to imply that the objects so described must be in a given sequence, either temporally, spatially, in ranking, or in any other manner.

In the claims below and the description herein, any one of the terms "comprising", "comprised of", or "which comprises" is an open term that means including at least the elements/features that follow, but not excluding others. Thus, the term "comprising", when used in the claims, should not be interpreted as being limitative to the means or elements or steps listed thereafter. For example, the scope of the expression "a device comprising A and B" should not be limited to devices consisting only of elements A and B. Any one of the terms "including" or "which includes" or "that includes" as used herein is also an open term that also means including at least the elements/features that follow the term, but not excluding others. Thus, "including" is synonymous with and means "comprising".

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there have been described specific embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added to or deleted from methods described within the scope of the present invention.

Various aspects of the present invention may be appreciated from the following enumerated example embodiments (EEEs):

EEE1. A method comprising:
  acquiring a set of voltage signals from a set of electrodes arranged in proximity to the ears of a user,
  based on the set of voltage signals, determining an EOG gaze vector in ego-centric coordinates,
  determining a head pose of the user in display coordinates, using a sensor device worn by the user,
  combining the EOG gaze vector and head pose to obtain a gaze vector in display coordinates, and
  determining a gaze point by calculating an intersection of the gaze vector and an imaging surface having a known position in display coordinates.

EEE2. The method according to EEE 1, further comprising:
  calibrating the sensor device to obtain a position of the sensor device in display coordinates.

EEE3. The method according to EEE 2, wherein the calibrating includes:
  displaying a graphical element on the imaging surface, and receiving user input confirming the user is looking at a location on the imaging surface corresponding to the graphical element.

EEE4. The method according to EEE 2, wherein the user-worn sensor device is synchronized with a second sensor device fixedly arranged relative to at least a portion of a display system including the imaging surface.

EEE5. The method according to EEE 2, wherein the calibrating includes determining a distance between the user and the imaging surface.

EEE6. The method according to EEE 5, wherein the distance is determined using one or several sensors in the display system.

EEE7. The method according to any one of the preceding EEEs, further comprising an on-line statistical calibration, including statistical analysis of the gaze point over time, and knowledge of expected user viewing patterns.

EEE8. The method according to any one of the preceding EEEs, wherein the egocentric coordinates include only one degree of freedom.

EEE9. The method according to any one of the preceding EEEs, wherein the display coordinates include only two degrees of freedom.

EEE10. The method according to any one of the preceding EEEs, wherein the display coordinates include six degrees of freedom.

EEE11. A method for processing image data including depth information for display on an imaging surface, the method comprising:
 determining a gaze point on the imaging surface using a method according to one of the preceding EEEs,
 determining a gaze depth based at least in part on depth information associated with the gaze point,
 calculating a relative depth associated with a first portion of the image data as the difference between depth information associated with the first portion of the image data and the gaze depth, and
 generating modified image data by modifying pixel data associated with the first portion of the image data in accordance with a function of the relative depth associated with the first portion of the image data.

EEE12. The method according to EEE 11, wherein modifying pixel data involves altering one or more of hue, brightness, gamma, and contrast of the pixel data.

EEE13. The method according to EEE 11, wherein modifying pixel data involves altering one or more of sharpness, blur, or spatial filtering of the pixel data.

EEE14. A method for processing audio objects associated with image data including depth information for display on an imaging surface, comprising: determining a gaze point on the imaging surface using a method according to one of EEEs 1-10,
 determining a gaze depth-based at least in part on depth information associated with the gaze point,
 based at least in part on the gaze point and the gaze depth, identifying at least one audio object associated with a current point of interest, and
 modifying the audio objects such that the identified audio objects are modified differently than other audio objects.

EEE15. The method according to EEE 13, wherein modifying the identified audio objects involves altering one of volume, loudness, and frequency distribution of the identified audio objects.

EEE16. The method according to EEE 13 or 14, wherein the current point of interest is determined as a function of the gaze point.

EEE17. A method for processing image data for display on an imaging surface, comprising:
 monitoring over time a gaze point on the imaging surface determined using a method according to one of EEEs 1-10,
 determining an average gaze position and a gaze radius, comparing the gaze radius with a radius threshold,
 in accordance with a determination that the gaze radius is smaller than the radius threshold, applying a zoom of the image data.

EEE18. The method according to EEE 17, further comprising low-pass filtering the zoom before application to the image data.

EEE19. The method according to EEE 17 or 18, further comprising
 determining a smallest distance between the average gaze position and one or more edges of the imaging surface,
 comparing the smallest distance with a distance threshold, and
 in accordance with a determination that the smallest distance is less than the distance threshold, applying an offset off the image data to increase the smallest distance.

EEE20. The method according to EEE 19, further comprising low-pass filtering the offset before application to the image data.

EEE21. The method according to EEE 17, wherein the gaze radius is based on the standard deviation around the average gaze position.

EEE22. The method according to EEE 17, wherein the average gaze position and the gaze radius are determined based on gaze point variation during a predetermined time window.

EEE23. A system comprising:
 a set of electrodes arranged in proximity to ears of a user and configured to acquire a set of voltage signals,
 an EOG processing unit for determining an EOG gaze vector in ego-centric coordinates based on the set of voltage signals,
 a user-worn sensor device for determining a head pose of the user in display coordinates,
 a processing unit configured to:
  combine the EOG gaze vector and head pose to obtain a gaze vector in display coordinates, and
  determine a gaze point by calculating an intersection of the gaze vector and an imaging surface having a known position in display coordinates.

EEE24. A non-transitory computer readable medium storing computer program code configured to perform, when executed on a computer processor, the steps of one of EEEs 1-22.

The invention claimed is:

1. A method comprising:
 acquiring a set of voltage signals from a set of electrodes arranged in proximity to ears of a user;
 based on the set of voltage signals, determining an electro-oculography (EOG) gaze vector in ego-centric coordinates;
 determining a head pose of the user in display coordinates, using a sensor device worn by the user;
 combining the EOG gaze vector and the head pose to obtain a gaze vector in display coordinates; and
 determining a gaze point by calculating an intersection of the gaze vector and an imaging surface having a known position in display coordinates.

2. The method according to claim 1, further comprising:
 calibrating the sensor device to obtain a position of the sensor device in display coordinates.

3. The method according to claim 2, wherein the calibrating includes:
 displaying a graphical element on the imaging surface; and receiving user input confirming the user is looking at a location on the imaging surface corresponding to the graphical element.

4. The method according to claim 2, wherein the user-worn sensor device is synchronized with a second sensor device fixedly arranged relative to at least a portion of a display system including the imaging surface.

5. The method according to claim 2, wherein the calibrating includes:
determining a distance between the user and the imaging surface, optionally using one or several sensors in the display system.

6. The method according claim 1, further comprising: performing an on-line statistical calibration including statistical analysis of the gaze point over time and knowledge of expected user viewing patterns.

7. The method of claim 1, further comprising:
receiving image data for display on the imaging surface;
determining a gaze depth based at least in part on depth information associated with the gaze point;
calculating a relative depth associated with a first portion of the image data as the difference between depth information associated with the first portion of the image data and the gaze depth; and
generating modified image data by modifying pixel data associated with the first portion of the image data in accordance with a function of the relative depth associated with the first portion of the image data.

8. The method according to claim 7, wherein modifying pixel data involves altering one or more of: hue, brightness, gamma, contrast, sharpness, blur, and spatial filtering of the pixel data.

9. The method of claim 1, further comprising:
receiving image data for display on the imaging surface;
determining a gaze depth based at least in part on depth information associated with the gaze point;
based at least in part on the gaze point and the gaze depth, identifying at least one audio object associated with a current point of interest; and
modifying the audio objects such that the identified audio objects are modified differently than other audio objects.

10. The method according to claim 9, wherein modifying the identified audio objects involves altering one of: volume, loudness, and frequency distribution of the identified audio objects.

11. The method of claim 1, further comprising:
receiving image data for display on the imaging surface;
monitoring over time the gaze point on the imaging surface;
determining an average gaze position and a gaze radius;
comparing the gaze radius with a radius threshold; and
in accordance with a determination that the gaze radius is smaller than the radius threshold, applying a zoom of the image data.

12. The method according to claim 11, further comprising:
determining a smallest distance between the average gaze position and one or more edges of the imaging surface;
comparing the smallest distance with a distance threshold; and
in accordance with a determination that the smallest distance is less than the distance threshold, applying an offset off the image data to increase the smallest distance.

13. The method according to claim 11, further comprising: low-pass filtering the offset or the zoom before application to the image data.

14. A system comprising:
a set of electrodes arranged in proximity to ears of a user and configured to acquire a set of voltage signals;
an electro-oculography (EOG) processing unit for determining an EOG gaze vector in ego-centric coordinates based on the set of voltage signals;
a user-worn sensor device for determining a head pose of the user in display coordinates;
a processing unit configured to:
combine the EOG gaze vector and the head pose to obtain a gaze vector in display coordinates; and
determine a gaze point by calculating an intersection of the gaze vector and an imaging surface having a known position in display coordinates.

15. A non-transitory computer readable medium storing computer program code configured to perform, when executed on a computer processor, the steps:
acquiring a set of voltage signals from a set of electrodes arranged in proximity to ears of a user;
based on the set of voltage signals, determining an electro-oculography (EOG) gaze vector in ego-centric coordinates;
determining a head pose of the user in display coordinates, using a sensor device worn by the user;
combining the EOG gaze vector and the head pose to obtain a gaze vector in display coordinates; and
determining a gaze point by calculating an intersection of the gaze vector and an imaging surface having a known position in display coordinates.

* * * * *